June 30, 1931.  G. SERRAGLI  1,811,867
SELF ROTATING AIR SCREW FOR THE AERODYNAMIC
BRAKAGE OF AEROPLANES AND THE LIKE
Filed Sept. 27, 1930
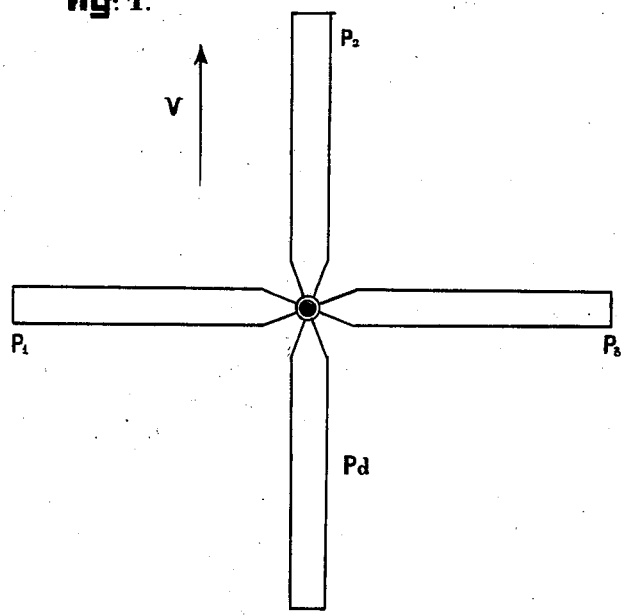
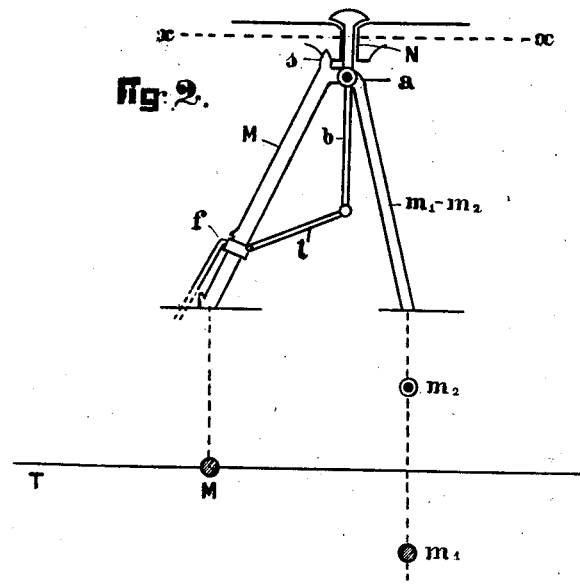
Inventor
Giovanni Serragli
per
Attorney Patented June 30, 1931

1,811,867

UNITED STATES PATENT OFFICE

GIOVANNI SERRAGLI, OF FLORENCE, ITALY

SELF ROTATING AIR SCREW FOR THE AERODYNAMIC BRAKAGE OF AEROPLANES AND THE LIKE

Application filed September 27, 1930, Serial No. 484,813, and in Italy October 24, 1929.

The present invention has for its object an air screw to be mounted loose on a flying machine, constructed and disposed in such a manner that it will assume a rotating movement whenever the angle of incidence of the aeroplane increases beyond a certain limit, due either to loss of velocity or to the control of the pilot, without giving rise to a side momentum during the oblique descent of the aeroplane. The axis of the air screw is arranged, in the normal conditions of an ordinary aeroplane in motion, in a practically vertical position, and when the angle of incidence of the aeroplane increases, the air screw begins to revolve, producing the aerodynamic brakage during the descent, thereby acting in the same manner as a parachute.

In the accompanying drawings which serve to illustrate schematically the present invention;

Fig. 1 shows the air screw in front view.

Fig. 2 is a view in side elevation of the trestle which serves to support it, showing also the same arrangement in plan.

Fig. 3 shows a section of one of the blades of the screw viz, the blade marked P$d$ in Fig. 1, showing also its angle with respect to the rotation plane of the screw. In Fig. 2, T represents the axis of the propeller of the aeroplane, which is normally in a practically horizontal position, corresponding to its vertical mean plane in the case of an aeroplane fitted with one propeller only.

On the fuselage (Fig. 2) is provided a supporting trestle formed by three members M—$m$—$m_2$ uniting at their upper end and forming a bearing for the hub N of the braking screw. The plane in which the blades of the said screw revolve is indicated by the line $xx$.

In normal conditions this plane is arranged so as to form only a small angle of incidence with the axis T of the traction propeller, however this angle can be varied at will by the pilot by means of a suitable system of levers. The hub N is mounted loose on a horizontal pivot $a$ which forms the upper end of an arm $b$, which at the other end is connected to a lever $l$ hinged on a sleeve $f$ sliding on the member M by means of a spindle controlled by the pilot in any desired position.

The air screw is mounted loose on the hub N and consequently it can freely revolve except when the said air screw is in an almost horizontal position (as shown in the drawings) when a projecting tooth $s$ fitted on the member M engages into corresponding notch provided in the hub N of the air screw which prevents its rotation when in the normal position. When however the sleeve $f$ is moved downwards, the axis of the screw assumes an inclined position, the tooth $f$ becomes disengaged from the notch in the hub, and the air screw is free to revolve round its pivot.

The braking screw, as shown in Fig. 1, is fitted with four blades, three of which, marked $p_1$ $p_2$ $p_3$ have no angle or practically no angle of inclination with respect to the hub, and consequently their planes coincide with the plane of rotation of the screw. The fourth blade P$d$ is formed with an angle of inclination which can either be constant or can be made to vary along its radius and preferably increased near the hub.

The width of the blade, instead of being constant, can preferably be made to widen from the hub towards the periphery. The average value of the angle of inclination of the blade can be varied according to its shape and size, and can have the value of only 2° to 6°, and can be increased up to 15°–20°. In each particular case it is possible, by the application of known aerodynamical principles, to calculate the value of the angle of inclination with which the best practical results are obtained in dependence of the working of the apparatus hereinafter described.

When the direction of movement of the aeroplane coincides with the axis of its propeller, in which case it can be considered as practically lying in the plane $xx$ of the air screw, this latter acquires a stable or non-rotating position caused by the blade P$d$ shown in section on Fig. 1, in which the arrow V shows the direction of movement of the aeroplane.

In the position above described, the air screw acts with a minimum effect as a fixed carrying surface. In fact, to each side movement of the blade P$d$ there is a corresponding aerodynamical effect on it, indicated by the small antagonistic arrows acting at the sides of the section of the blade as shown in Fig. 3. Consequently there is in any case a force which tends to maintain the blade P$d$ in a fixed position, viz: parallel to the direction of movement of the aeroplane. When the direction V becomes inclined with respect to the plane $xx$ (which may be produced either by loss of speed of the aeroplane or by the voluntary control of the pilot), the steadying action of the blade P$d$ ceases, and the air screw starts revolving automatically, thus acting as a braking screw and retarding the velocity of descent of the aeroplane.

For angles of incidence varying from 20° to 40°, the air screw has a self rotating movement in which the blade P$d$ while revolving in the plane $xx$ of the screw advances with no carrying effect and returns back in operative supporting position. In this way the side momentum caused by the self rotating screw moving in an oblique direction is completely eliminated. By letting free the sleeve $f$ when the screw revolves, it is possible to accomplish longitudinal movements without troublesome gyroscopic effects, because the axis of the screw is free to maintain the absolute position it has originally acquired by the gyroscopic action.

The total effect of the aerodynamic resistance produced by the air screw when it is maintained in position by the blade P$d$, and also the carrying effect given by the blade P$_2$, when the air screw is bell shaped, so as to obtain the compensation between the centrifugal force and the impulse, give together a moment which, when the pilot liberates sufficiently the sleeve $f$ by sliding it on the supporting member M brings the axis of the screw to rest on M in a stable manner. When the locking tooth $s$ is used, on inclining the air screw backwards, it disengages from its notch in the hub and the air screw remains free to revolve.

Claims:

1. Braking air screw for retarding the descent of aeroplanes and the like, characterized by the fact that it is mounted loose on a shaft at right angle to the direction of the traction axis of the aeroplane, which corresponds normally to the vertical position, and is formed by four blades rigidly fixed to a hub, three of which blades forming an angle of inclination nil or practically nil with the plane of revolution of the air screw, so that when the direction of movement of the airplane coincides with the plane of the air screw, the fourth blade acts as a steering surface to prevent the air screw from revolving and when the aeroplane inclines forward the screw starts revolving thus acting as a brake for moderating the velocity of the descent.

2. Braking air screw according to claim 1 characterized in that the blade of the air screw which acts as steering surface has a width which gradually increases from the hube to its periphery and forms an angle of incident with the revolving plane of the air screw which gradually increases from the periphery to the hub.

3. Braking air screw according to claim 1 the hub of which is supported by a horizontal pivot, and the shaft of the hub forms an extension connected to a suitable control at reach of the pilot which allows it to oscillate in a vertical plane thus varying the angle which it forms with the direction of the movement.

4. Braking air screw according to claim 1, the hub of which is supported by a horizontal pivot, in which the shaft of the hub forms an extension connected to a suitable control at reach of the pilot and in which the connections between the screw and its controls allows either to shift said screw to any desired inclined position, within the limits of the angle of oscillation, or to leave it free so that it will maintain its absolute position in the space while the aeroplane oscillates in the longitudinal plane.

5. Braking screw according to claim 1 in which the support of the hub is provided with a projecting tooth which may engage into a corresponding notch provided in the air screw, so that this latter is locked when the direction of movement is parallel to the direction of the propeller axis and is automatically freed when the angle of incidence reaches a pre-determined value.

In testimony whereof I have affixed my signature this 12th day of September, 1930.

GIOVANNI SERRAGLI.